(12) United States Patent
Rider et al.

(10) Patent No.: US 9,942,295 B2
(45) Date of Patent: Apr. 10, 2018

(54) LIVE CROWDSOURCED MEDIA STREAMING

(71) Applicant: Intel Corporation, Santa Clara, CA (US)

(72) Inventors: Tomer Rider, Naahryia (IL); Shahar Taite, Kfar Saba (IL); Jim S. Baca, Corrales, NM (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,422

(22) PCT Filed: Jun. 28, 2013

(86) PCT No.: PCT/US2013/048574
§ 371 (c)(1),
(2) Date: Mar. 8, 2016

(87) PCT Pub. No.: WO2014/209363
PCT Pub. Date: Dec. 31, 2014

(65) Prior Publication Data
US 2016/0191591 A1  Jun. 30, 2016

(51) Int. Cl.
*H04L 29/06* (2006.01)
*H04N 21/482* (2011.01)
(Continued)

(52) U.S. Cl.
CPC ............ *H04L 65/602* (2013.01); *G06F 17/30* (2013.01); *H04L 65/00* (2013.01);
(Continued)

(58) Field of Classification Search
CPC ............... H04L 65/4076; H04L 65/605; H04L 65/4084; H04L 65/602; H04L 67/10;
(Continued)

(56) References Cited

U.S. PATENT DOCUMENTS 7,730,036 B2  6/2010  Blose et al.
8,862,764 B1 * 10/2014  Garcia-Barrio ......... G06F 1/163
                                                   709/231
(Continued)

FOREIGN PATENT DOCUMENTS

KR  1020120050016 A   5/2012
KR  1020120099928 A   9/2012
WO     2013147902 A1  10/2013

OTHER PUBLICATIONS

International Search Report and Written Opinion received for International Application No. PCT/US2013/048574, dated Mar. 31, 2014, 11 pages.
(Continued)

*Primary Examiner* — Ruolei Zong
(74) *Attorney, Agent, or Firm* — Banres & Thornburg LLP

(57) ABSTRACT

Technologies for crowdsourced media streaming include a number of mobile computing devices configured to capture media streams and transmit the media streams to a media server. The media server associates the media streams with metadata describing the media streams, including metadata describing an event captured in the media stream. The media server also processes the media streams to generate additional metadata. A number of client computing devices may submit media stream requests to the media server, and the media server contemporaneously streams matching media streams to the client computing devices as the media streams are captured by the mobile computing devices. The client computing devices may transmit feedback information relating to the media stream to the source mobile computing device via the media server. The client computing devices
(Continued)

may display the media streams alongside or overlaying other media such as a broadcast media event. Other embodiments are described and claimed.

21 Claims, 5 Drawing Sheets

(51) Int. Cl.
G06F 17/30 (2006.01)
H04N 21/266 (2011.01)
H04N 21/2743 (2011.01)
H04N 21/414 (2011.01)
H04N 21/4223 (2011.01)
H04N 21/435 (2011.01)
H04N 21/44 (2011.01)
H04N 21/475 (2011.01)
H04N 21/4788 (2011.01)
H04L 29/08 (2006.01)
H04N 21/278 (2011.01)
H04N 21/81 (2011.01)

(52) U.S. Cl.
CPC ...... *H04L 65/4038* (2013.01); *H04L 65/4076* (2013.01); *H04L 65/80* (2013.01); *H04L 67/10* (2013.01); *H04L 67/18* (2013.01); *H04L 67/306* (2013.01); *H04N 21/26603* (2013.01); *H04N 21/278* (2013.01); *H04N 21/2743* (2013.01); *H04N 21/41407* (2013.01); *H04N 21/4223* (2013.01); *H04N 21/435* (2013.01); *H04N 21/44008* (2013.01); *H04N 21/4756* (2013.01); *H04N 21/4788* (2013.01); *H04N 21/4828* (2013.01); *H04N 21/812* (2013.01)

(58) Field of Classification Search
CPC ..... H04L 67/30; H04L 65/403; H04L 65/607; H04L 65/00; H04L 65/4038; H04N 21/2187; H04N 21/2743; H04N 21/44222; H04N 7/15
USPC ........................................................ 709/217
See application file for complete search history.

(56) References Cited

U.S. PATENT DOCUMENTS

| | | | |
|---|---|---|---|
| 8,931,011 B1* | 1/2015 | Hitchcock | H04N 21/472 725/105 |
| 2005/0033758 A1* | 2/2005 | Baxter | G06F 17/30038 |
| 2005/0193421 A1 | 9/2005 | Cragun | |
| 2006/0242234 A1 | 10/2006 | Counts et al. | |
| 2009/0325602 A1* | 12/2009 | Higgins | H04W 4/02 455/456.2 |
| 2010/0095223 A1* | 4/2010 | Beers | G06Q 10/10 715/751 |
| 2010/0296571 A1 | 11/2010 | El-Saban et al. | |
| 2010/0299703 A1 | 11/2010 | Altman | |
| 2011/0225178 A1 | 9/2011 | Ingrassia et al. | |
| 2012/0023099 A1 | 1/2012 | Crossley et al. | |
| 2012/0198335 A1 | 8/2012 | Huang | |
| 2012/0203799 A1 | 8/2012 | Blanchflower et al. | |
| 2012/0226752 A1 | 9/2012 | Jeong et al. | |
| 2012/0303834 A1 | 11/2012 | Adam | |
| 2012/0316962 A1* | 12/2012 | Rathod | G06F 17/30861 705/14.54 |
| 2012/0320013 A1* | 12/2012 | Perez | H04N 9/8205 345/207 |
| 2013/0031162 A1 | 1/2013 | Willis et al. | |
| 2015/0032858 A1* | 1/2015 | Motrenko | H04L 51/10 709/219 |

OTHER PUBLICATIONS

"Crowdsourcing," Wikipedia, The Free Encyclopedia, retrieved from: <http://en.wikipedia.org/w/index.php?title=Crowdsourcing &oldid=524287297>, edited Nov. 22, 2012, 10 pages.
European Search Report for Patent Application No. 13888250.1-1905/3014888, dated Jan. 24, 2017, 7 pages.
First Office Action dated Jan. 17, 2018 for Chinese Patent Application No. 201380077080.4, 7 pages.

* cited by examiner

LIVE CROWDSOURCED MEDIA STREAMING

CROSS REFERENCE TO RELATED APPLICATIONS

This application is a national stage entry under 35 USC § 371(b) of International Application No. PCT/US2013/048574, which was filed Jun. 28, 2013.

BACKGROUND

Today, individuals typically carry at least one mobile computing device such as a mobile phone, smartphone, tablet, or other device with them at times. Those mobile computing devices may include advanced media capture capabilities, such as video recorders, cameras, and microphones. Those same devices often typically include persistent network data connections. Thus, many devices—potentially thousands—capable of media capture are present at almost every public event.

Today, much of the media captured using mobile computing devices is shared with others through one or more social networks. Those social networks typically limit media sharing to a pre-defined group of related individuals. Additionally, social networks typically do not organize or index media shared by users.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
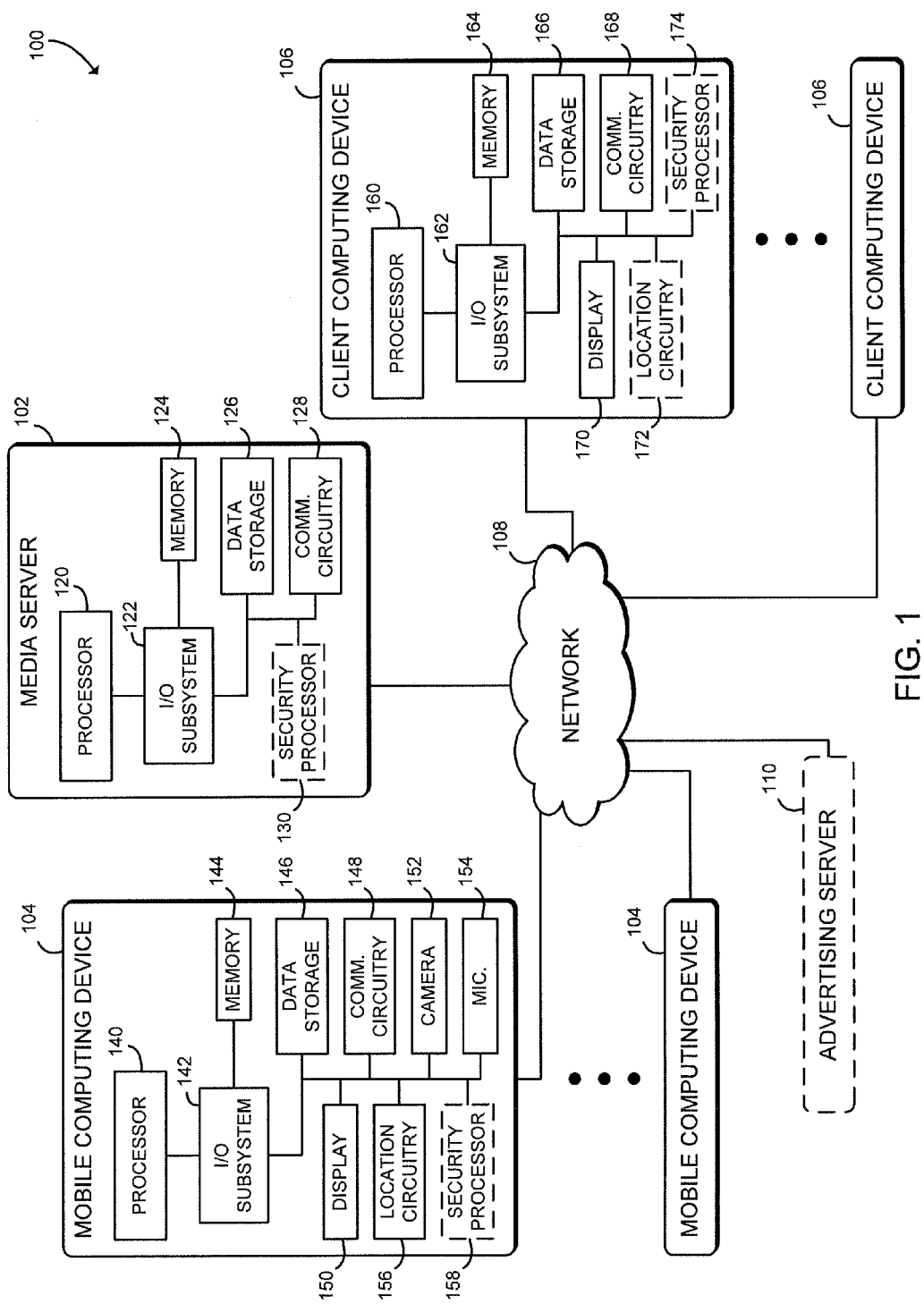
FIG. 1 is a simplified block diagram of at least one embodiment of a system for live crowdsourced media streaming.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for live crowdsourced media streaming includes a media server 102, one or more mobile computing devices 104, and one or more client computing devices 106, all in communication with each other over a network 108. In some embodiments, the system 100 may also include an advertising server 110. In use, as discussed in more detail below, the mobile computing devices 104 capture media streams such as video streams, audio streams, or a series of still images, and upload the media streams to the media server 102. The media server 102 aggregates and processes the uploaded media streams and associates the media streams with metadata. The metadata may describe the event captured in the media stream, for example by name, date, location, content, or other context data. The client computing devices 106 submit media requests specifying a requested event, and matching media streams are streamed to the client computing device 106 contemporaneously with their capture by the mobile computing devices 104. It should be appreciated that the contemporaneous media streams, although streamed nearly in real time with their capture, may not be streamed instantaneously. For example, the contemporaneous media streams may be subject to inherent communication delays, buffering delays, processing delays, or other short delays incidental to the streaming. Although the illustrative system 100 includes distinct mobile computing devices 104 and client computing devices 106, in some embodiments a single physical device may perform both such roles. For example, a smartphone may be capable of both capturing a media stream and displaying a media stream contemporaneously or at different times.

The disclosed technologies allow multiple experiences of a single event to be shared easily and in near real-time to users across the world. Thus, the event experience may be enhanced for both those viewing the event remotely as well as those in attendance at the event. Additionally, direct feedback between content consumers and content producers in the crowd may enable additional opportunities for monetizing content generation.

The media server 102 may be embodied as any type of server computing device, or collection of devices, capable of performing the functions described herein. As such, the media server 102 may be embodied as a single server computing device or a collection of servers and associated devices. For example, in some embodiments, the media server 102 may be embodied as a "virtual server" formed from multiple computing devices distributed across the network 108 and operating in a public or private cloud. Accordingly, although the media server 102 is illustrated in FIG. 1 and described below as embodied as a single server computing device, it should be appreciated that the media server 102 may be embodied as multiple devices cooperating together to facilitate the functionality described below.

As shown in FIG. 1, the media server 102 includes a processor 120, an input/output subsystem 122, a memory 124, a data storage device 126, and a communication circuit 128. Of course, the media server 102 may include other or additional components, such as those commonly found in a computer workstation (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the media server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the media server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the media server 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The data storage device 126 may store, permanently or temporarily, media streams received from the mobile computing devices 104 as well as associated metadata.

The communication circuit 128 of the media server 102 may be embodied as any communication circuit, device, or collection thereof, capable of enabling communications between the media server 102, the mobile computing devices 104, the client computing devices 106, and/or other remote devices. The communication circuit 128 may be configured to use any one or more communication technology (e.g., wireless or wired communications) and associated protocols (e.g., Ethernet, Bluetooth®, Wi-Fi®, WiMAX, etc.) to effect such communication.

In some embodiments, the media server 102 may include a security processor 130. The security processor 130 of the media server 102 may be embodied as hardware and/or associated firmware or software configured to enhance the security and/or trustworthiness of the media server 102. In some embodiments, the security processor 130 may be embodied as a security co-processor capable of operating independently of the processor 120 (e.g., regardless of the operational state of the processor 120) to provide a secure and isolated environment that cannot be accessed by the processor 120 or other components of the media server 102. For example, the security processor 130 may be embodied as a manageability engine ("ME") or an out-of-band processor. In other embodiments, the security processor 130 may be embodied as a trusted hardware component such as a trusted platform module ("TPM"). In some embodiments, the security processor 130 may form part of another component of the media server 102, such as the I/O subsystem 122 or the processor 120.

Each of the mobile computing devices 104 is configured to capture media data and transmit the captured media data to the media server 102. Each mobile computing device 104 may be embodied as any type of mobile computing device capable of performing the functions described herein, including, without limitation, a computer, a smartphone, a tablet computer, a laptop computer, a notebook computer, a cellular telephone, a handset, a messaging device, a vehicle telematics device, a network appliance, a web appliance, a distributed computing system, a multiprocessor system, a processor-based system, and/or a consumer electronic device. Illustratively, each mobile computing device 104 includes a processor 140, an I/O subsystem 142, a memory 144, a data storage 146, a communication circuit 148, in some embodiments a security processor 158, and/or other components and devices commonly found in a smartphone or similar computing device. Those individual components of the mobile computing device 104 may be similar to the corresponding components of the media server 102, the description of which is applicable to the corresponding components of the mobile computing device 104 and is not repeated herein so as not to obscure the present disclosure.

The mobile computing device 104 further includes a display 150, a camera 152, a microphone 154, and location circuitry 156. The display 150 of the mobile computing device 104 may be embodied as any type of display capable of displaying digital information such as a liquid crystal display (LCD), a light emitting diode (LED), a plasma display, a cathode ray tube (CRT), or other type of display device.

The camera 152 may be embodied as a digital camera or other digital imaging device integrated with the mobile computing device 104. The camera 152 includes an electronic image sensor, such as an active-pixel sensor (APS), e.g., a complementary metal-oxide-semiconductor (CMOS) sensor, or a charge-coupled device (CCD). The camera 152 may be capable of capturing still images and/or video. The microphone 154 includes a transducer to capture audible sound waves as sound information on the mobile computing device 104. Instead of a microphone 154, in other embodiments, the mobile computing device 104 may include any sensor capable of capturing audio signals, such as a line input jack, an analog-to-digital converter (ADC), or other type of audio sensor. The microphone 154 may be capable of capturing standalone audio or, in conjunction with the camera 152, audio information for a video recording.

In the illustrative embodiment, the mobile computing device 104 includes location circuitry 156. The location circuitry 156 may be embodied as any type of sensor or circuitry capable of determining the precise or approximate position of the mobile computing device 104. For example, the location circuitry 156 may be embodied as a global positioning system ("GPS") receiver, capable of determining the precise coordinates of the mobile computing device 104. In other embodiments, the location circuitry 156 may use trilateration and/or triangulation to determine the position of the mobile computing device 104 using distances and/or angles to cellular network towers with known positions, provided by the communication circuit 148. In other embodiments, the location circuitry 156 may determine the approximate position of the mobile computing device 104 based on association to wireless networks with known positions, using the communication circuit 148.

Each of the client computing devices 106 is configured to request media streams from the media server 102 and present the media stream(s) to a user. Each client computing device 106 may be embodied as any type of computing device capable of performing the functions described herein, including, without limitation, a computer, a desktop computer, a digital television, a workstation, a smartphone, a tablet computer, a laptop computer, a notebook computer, a cellular telephone, a handset, a messaging device, a vehicle telematics device, a network appliance, a web appliance, a distributed computing system, a multiprocessor system, a processor-based system, and/or a consumer electronic device. Illustratively, a client computing device 106 includes a processor 160, an I/O subsystem 162, a memory 164, a data storage 166, a communication circuit 168, a display 170, in some embodiments location circuitry 172, in some embodiments a security processor 174, and/or other components and devices commonly found in a smartphone or similar computing device. Those individual components of the client computing device 106 may be similar to the corresponding components of the media server 102 and/or the mobile computing device 104, the description of which is applicable to the corresponding components of the client computing device 106 and is not repeated herein so as not to obscure the present disclosure. Additionally, in some embodiments the client computing device 106 may be embodied as a server device providing services to other users. For example, the client computing device 106 may be embodied as a commercial content producer, third-party mapping service, search engine, or other service that embeds media streams provided by the media server 102.

As discussed in more detail below, the media server 102, the mobile computing devices 104, and the client computing devices 106 are configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), and/or a publicly-accessible, global network such as the Internet. As such, the network 108 may include any number of additional devices, such as additional computers, routers, and switches, to facilitate communications among the devices of the system 100.

The advertising server 110 is configured to provide advertisements that may be relevant to media streams provided to the client computing devices 106. As such, the advertising server 110 may include components and features similar to the media server 102 such as a processor, I/O subsystem, memory, data storage, communication circuitry, and various peripheral devices, which are not illustrated in FIG. 1 for clarity of the present description. Further, although the illustrative system 100 of FIG. 1 includes one advertising server 110, it should be understood that any number of advertising servers 110 may interact with the system 100.

Figure 2:
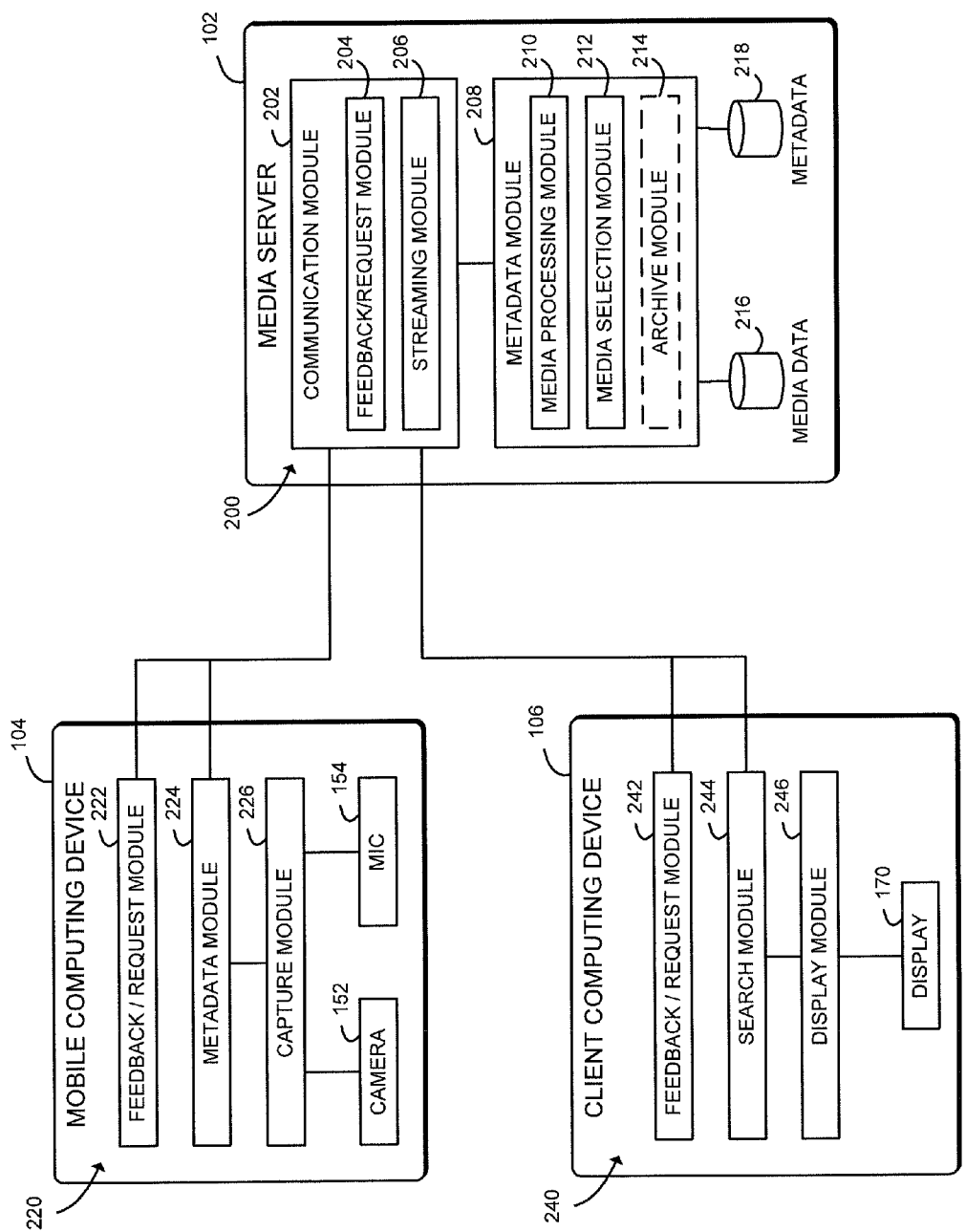
FIG. 2 is a simplified block diagram of at least one embodiment of a number of environments that may be established by the system of FIG. 1.

Referring now to FIG. 2, in an illustrative embodiment, the media server 102 establishes an environment 200 during operation. The illustrative environment 200 includes a communication module 202, a metadata module 208, media data 216, and metadata 218. The various modules of the environment 200 may be embodied as hardware, firmware, software, or a combination thereof.

The communication module 202 is configured to receive media streams uploaded from the mobile computing devices 104 and contemporaneously stream the media streams to the client computing devices 106 in response to media stream requests. The communication module 202 is further configured to transmit feedback or request information relating to the media streams from the client computing devices 106 to the mobile computing devices 104, and to transmit response information from the mobile computing devices 104 to the client computing devices 106. In some embodiments, those functions may be performed by sub-modules, for example by a feedback/request module 204 or a streaming module 206.

The metadata module 208 is configured to associate metadata 218 with the media streams and to select media streams matching media stream requests received from the client computing devices 106. The metadata module 208 is further configured to process the media streams to generate additional metadata. In some embodiments, the metadata module 208 may be configured to archive media streams and metadata 218 for later retrieval and streaming. In such embodiments, those functions may be performed by sub-modules, for example by a media processing module 210, a media selection module 212, or an archive module 214.

The media data 216 is configured to store media data needed to stream the media streams to the client computing devices 106. In some embodiments, the media data 216 may store full copies of the media streams; in other embodiments, the media data 216 may store portions of the media streams. In still other embodiments, the media data 216 may not store the media streams themselves and may instead store data necessary to redirect media streams directly from the mobile computing devices 104 to the client computing devices 106. In some embodiments, the media data 216 may be immediately discarded after streaming or only retained for a short time after streaming. In other embodiments, the media data 216 may be archived for future retrieval. In some embodiments, the media data 216 may include additional historical media submitted by users of the mobile computing devices 104, in addition to archived media streams. Thus, the media data 216 may include coverage of historical events occurring prior to the existence of the system 100.

The metadata 218 is configured to store data describing various attributes of the media streams. The metadata 218 may be used by the metadata module 208 to select and filter media streams based on search requests received from the client computing devices 106. The metadata 218, in concert with the media data 216, aggregates multiple media streams, allowing clients to receive media streams relevant to particular places or events. Thus, the metadata 218 includes an event attribute describing an event captured in each media stream. The event attribute may include any data used to identify an event, and may be supplied by a human user or by a machine, such as the mobile computing device 104. For example, the event attribute may include an event name, an event date and location, an event type, a description of the event content, or a description of the event venue. In some embodiments, the event may be associated with a broadcast media event, for example, a live television broadcast, a radio broadcast, a live internet stream, or similar transmission of an event to numerous end users. In addition to event attributes, the metadata 218 may include any other attribute describing the media stream that may be used to define a search request. For example, the metadata 218 may describe faces recognized in the media stream, the number of persons recognized in the media stream, the emotions of persons recognized in the media stream, the image quality of the media stream, relevance of the media stream to various other attributes such as the event attribute, the view angle of the media stream, and objects recognized in the media stream. The metadata 218 may be embedded in the media stream at capture by the mobile computing device 104, or may be generated during media processing by the metadata module 208.

Still referring to FIG. 2, in the illustrative embodiment, the mobile computing device 104 establishes an environment 220 during operation. The illustrative environment 220 includes a feedback/request module 222, a metadata module 224, and capture module 226. The various modules of the environment 220 may be embodied as hardware, firmware, software, or a combination thereof.

The capture module 226 is configured to capture a media stream using various sensors of the mobile computing device 104. For example, the capture module 226 may capture a video stream, and audio stream, or a series of still images using the camera 152 and/or the microphone 154. The metadata module 224 is configured to embed metadata into the captured media stream and transmit the media stream to the media server 102. In some embodiments, the metadata module 224 may embed a current location and date into the media stream, for example using the location circuitry 156.

The feedback/request module 222 is configured to receive feedback or request information from the media server 102. As described below, the feedback or request information may include any information submitted by a user of a client computing device 106 to the media server 102 and forwarded to the mobile computing device 104. The feedback/request module 222 is further configured to allow the user of the mobile computing device 104 to respond to the feedback information, and to transmit response information to the media server 102.

Still referring to FIG. 2, in the illustrative embodiment, the client computing device 106 establishes an environment 240 during operation. The illustrative environment 220 includes a feedback/request module 242, a search module 244, and a display module 246. The various modules of the environment 240 may be embodied as hardware, firmware, software, or a combination thereof.

The search module 244 is configured to prepare a media stream request including one or more search parameters specifying requested media streams and to transmit the media stream request to the media server 102. The media stream request may be prepared based on input received from the user of the client computing device 106, or may be based on a client user profile. The search parameter of the media stream request corresponds to the metadata 218 associated with the requested media streams. For example, the search parameter may specify an event name, an event date and location, an event type, a description of the event content, or a description of the event venue. Additionally, the search parameter may specify faces recognized in the media stream, the number of persons recognized in the media stream, the emotions of persons recognized in the media stream, the image quality of the media stream, relevance of the media stream to various other attributes such as the event attribute, the view angle of the media stream, and objects recognized in the media stream.

The display module 246 is configured to receive one or more media streams from the media server 102 and present the media streams to the user of the client computing device 106. In some embodiments, the display module 246 may display media streams such as video or still images on the display 170 of the client computing device 106. In other embodiments and for other media streams, the display module 246 may use any appropriate method to present the media stream to the user. For example, the display module 246 may play back an audio stream through an audio speaker of the client computing device 106.

The feedback/request module 242 is configured to transmit feedback or request information to the media server 102. As described below, the feedback or request information may include any information submitted by the user of the client computing device 106 to the media server 102 to be forwarded to the mobile computing device 104. The feedback/request module 242 is further configured receive response information from the media server 102 that may be submitted by the mobile computing device 104.

Figure 3:
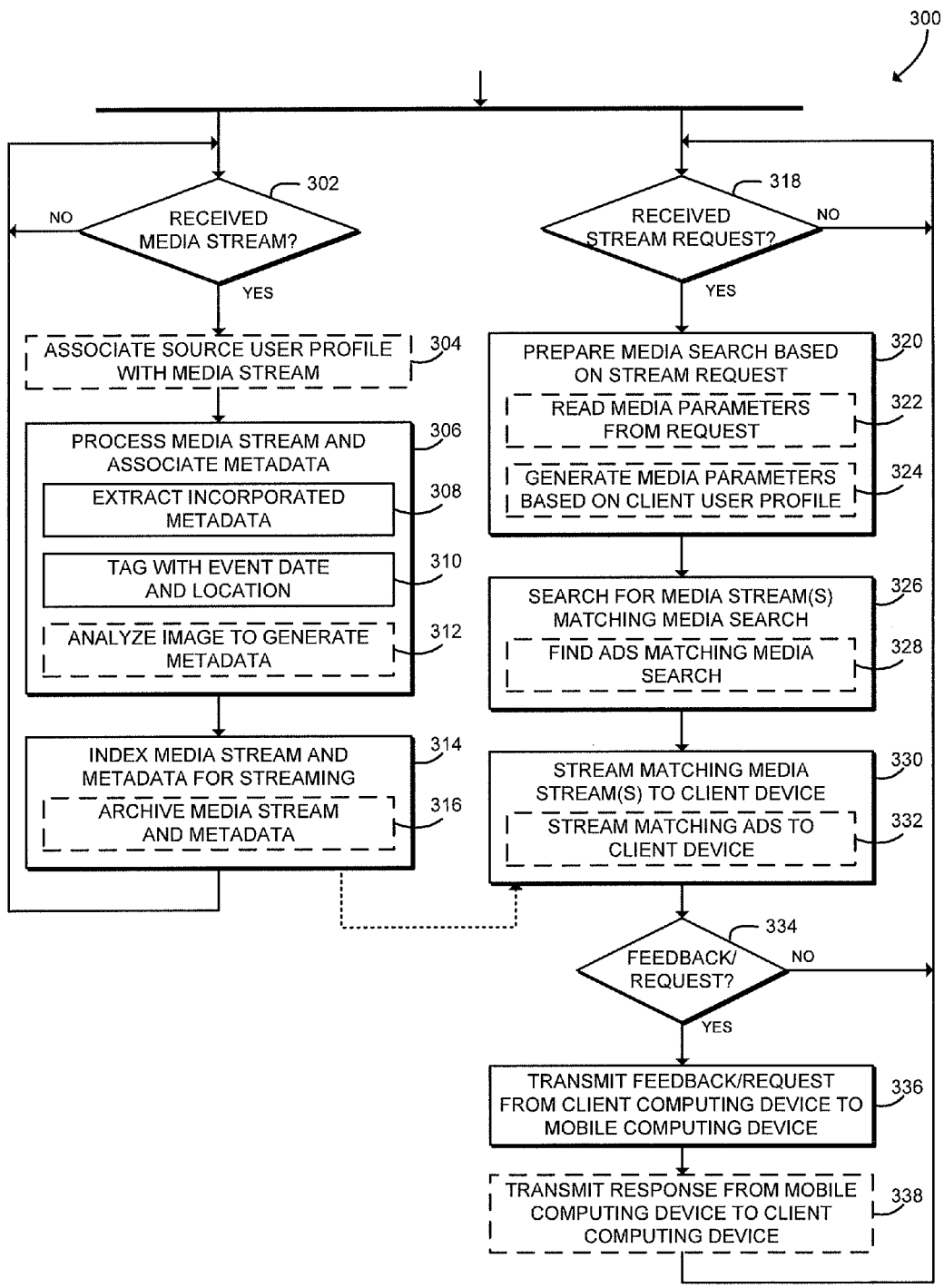
FIG. 3 is a simplified flow diagram of at least one embodiment of a method for live crowdsourced media streaming that may be executed by a media server of FIGS. 1 and 2.

Referring now to FIG. 3, in use, the media server 102 may execute a method 300 for live crowdsourced media streaming. The method 300 begins by forking into two contemporaneous threads of execution, one to receive a media stream from a mobile computing device 104 and the other to stream the media stream to a client computing device 106. Although illustrated as executing simultaneously or contemporaneously, in some embodiments the operations may execute in separate processes, sequentially, in an interleaved manner, or in any other manner capable of executing the described method.

In block 302, the media server 102 determines whether a media stream has been received from a mobile computing device 104. If not, the method 300 loops back to block 302 to continue waiting for a media stream. However, if a media server 102 receives a media stream in block 302, the method 300 advances to block 304.

In block 304, in some embodiments the media server 102 associates a source user profile with the received media stream. The source user profile identifies a user of the mobile computing device 104 transmitting the received media stream, and may be used to store rating, scoring, or quality information related to media streams produced by the user. As described below, the rating or scoring information may be provided by users of the client computing devices 106 through the feedback mechanism. The source user profile may be associated with the source user through a user login procedure or may be associated automatically without user intervention.

In block 306, the media server 102 processes the media stream and associates metadata 218 with the media stream. The metadata 218 may describe attributes of the event captured in the media stream. For example, the metadata 218 may include an event name, event date and location, event type, event content, event description, event venue, or any other metadata 218 that may be used by a user to identify the event. Each item of the metadata 218 may be stored in alternate forms to facilitate discovery; for example, the event name may be stored as both the formal name for an event as well as the event's popular name. In block 308, the media server 102 extracts any metadata 218 incorporated in the media stream itself. For example, the mobile computing device 104 may embed GPS coordinates in the uploaded media stream. In block 310, the media server 102 tags the media stream with metadata 218 describing the event date and location. If not extracted from the media stream, the event date and location may be provided by the user or determined by the media server 102. For example, the media server 102 may approximate the current location of the mobile computing device 104 by tracing the route to the mobile computing device 104 through the network 108.

In block 312, in some embodiments the media server 102 analyzes the media stream to generate additional metadata 218. For example, the media server 102 may perform facial recognition on the media stream, determine the number of persons recognized in the media stream, determine the emotions displayed by persons recognized in the media stream, determine the image quality of the media stream, determine the relevance of the media stream to the current event, determine the precise view angle of the media stream, recognize objects pictured in the media stream, and/or perform any other media analysis capable of generating searchable metadata. In some embodiments, the media server 102 may associate the media stream with additional contextual metadata describing the structure of an event or a venue. The contextual metadata may be submitted by the administrator of the media server 102, by an entity associated with the event, or by users of the mobile computing devices 104 themselves. In such embodiments, the user of the mobile computing device 104 may tag his or her position at the event within the additional contextual metadata. The position of each user may be recognized automatically, for example through location and view angle information, or may be supplied by the user. For example, the contextual metadata may describe the seating arrangements at a particular venue by section, row, seat number, etc., and the position of each user may be described within that contextual structure, creating a fine-grained record of the media streams covering an event. To analyze the media stream, in some embodiments the media server 102 may decrypt, authenticate, or otherwise access the media stream using the security processor 130.

In block 314, the media server 102 indexes the media stream and makes the media stream available for streaming. As described below, a client computing device 106 may receive the media stream substantially contemporaneously with its upload by the mobile computing device 104. In some embodiments, after determining the view angle of each media stream, the media server 102 may index media streams from different view angles to provide a full view of an event. Similarly, in some embodiments, the media server 102 may merge or eliminate certain media streams that duplicate or closely approximate other media streams, to reduce streaming volume. In some embodiments, the media server 102 may combine the media streams from different viewing angles into a panoramic view of the event. Additionally, in some embodiments, the media server 102 may sign, encrypt, or otherwise protect the media stream from unauthorized access using the security processor 130. In block 316 the media server 102 may also archive the media stream and the metadata 218 for future retrieval. As described below, a client computing device 106 may specify a past date or date range in order to view media streams recorded at a particular past event. After indexing the media stream, the method 300 loops back to block 302 to receive additional media streams.

Referring now to block 318, substantially contemporaneously with block 302, the media server 102 determines whether a stream request has been received from a client computing device 106. If not, the method 300 loops back to block 318 to continue awaiting stream requests. If so, the method 300 advances to block 320.

In block 320, the media server 102 prepares a media search based on the received stream request. In block 322, in some embodiments the media server 102 may read search parameters included in the request. The search parameters may correspond to metadata 218 associated with media streams discussed above in block 306. For example, the search parameter may specify event attributes such as event name, event date and location, event type, event content, event description, event venue, or any other metadata 218 that may be used by a user to identify the event. In some embodiments, the search parameter may specify a source user score associated with the producer of the media stream. The source user score may be used to search for media streams produced by high-scoring users of the mobile computing devices 104, enabling a user-focused, social approach to live media streaming. As another example, the search parameter may specify other metadata, such as faces captured in the media stream, number of persons captured in the media stream, emotions of persons captured in the media stream, image quality of the media stream, relevance of the media stream to the event, view angles of the media stream, and objects captured in the media stream.

In block 324, in some embodiments the media server 102 may determine search parameters based on a client user profile associated with a user of the client computing device 106. The client user profile may store user preferences or defaults used for all media stream searches. In some embodiments, the client user profile may store past behavior of the user. For example, the client user profile may record media accessed by the user, rating or scoring of media entered by the user, past search terms entered by the user, or other information indicative of past behavior of the user. The media server 102 may use machine learning algorithms to determine places or events relevant to the user based on the past behavior associated with the client user profile.

In block 326, the media server 102 searches the media data 216 and the metadata 218 for media streams matching the media search. Such matching media streams are likely to be relevant to the user. In some embodiments, in block 328, the media server 102 searches the advertising server 110 for advertisements matching the media search. In some embodiments, advertisements may be matched to media streams and stream requests based on the metadata 218 associated with the media stream, including the event attribute. Additionally, in some embodiments, advertisements may be matched to media streams and stream requests based on scoring or rating information of the source user profile associated with the media stream. For example, an advertiser may search based on scoring information to sponsor certain high-scoring users of mobile computing devices 104.

In block 330, the media server 102 streams the matching media streams to the client computing device 106. The media streams are streamed to the client computing device 106 substantially contemporaneously with their receipt from the mobile computing devices 104, as illustrated by the dotted arrow between blocks 314 and 330. The media server 102 may stream all matching streams or a subset of all matching streams contemporaneously, sequentially, or in any other order. In some embodiments, the media server 102 may sign, encrypt, or otherwise protect the media stream from unauthorized access using the security processor 130. As described below, the client computing device 106 presents the media streams to the user, allowing for an enhanced event experience. As such, it should be appreciated that, in some embodiments, multiple media streams may be received by and presented on the client computing device 106 contemporaneously with each other. In block 332, in some embodiments, the media server 102 streams the matching advertisements to the client computing device 106. The advertisements may be streamed contemporaneously with the media stream, streamed between media streams, or may interrupt the media streams, as with a traditional television commercial.

After or during media streaming, in block 334, the media server 102 determines whether feedback or a request relating to a media stream has been received from the client computing device 106. If no feedback has been received, the method 300 loops back to block 318. If feedback has been received, the method 300 advances to block 336.

In block 336, the media server 102 transmits the feedback and/or request from the client computing device 106 to the mobile computing device 104 that produced the media stream. Feedback may be entered by the user of the client computing device 106 in response to a particular media stream. Feedback information may be embodied as a simple message to the content creator, rating or scoring information relating to the media stream, a request for similar content, a request for a modification to the media stream (e.g., changing locations, zooming in, refocusing on different aspects of the scene, etc.), or any other information submitted by the user of the client computing device 106 to the user of the mobile computing device 104. In some embodiments, the feedback information may include an offer to purchase rights in the media stream. Such an offer to purchase rights in the media stream may include an offer to purchase the media outright, an offer to pay for the right to incorporate the media in a commercial work, or any other offer of compensation in return for the right to use the media stream. For example, a user of a client computing device 106 may contact the publishing user of the mobile computing device 104 for additional information regarding a media stream. As another example, a commercial content provider such as a television producer may offer to compensate the user of the mobile computing device 104 in return for allowing the media stream to be incorporated into a news program. As another example, users may offer to pay for the creation of new media streams and may specify the requested attributes for such media streams.

In block 338, in some embodiments the media server 102 may transmit a response received from the mobile computing device 104 to the client computing device 106. Similar to the feedback information, the response may include any information submitted by the user of the mobile computing device 104 to the user of the client computing device 106. For example, the response may include an acceptance of an offer for compensation. After transmitting the response, the method 300 loops back to block 318 to receive additional stream requests.

Figure 4:
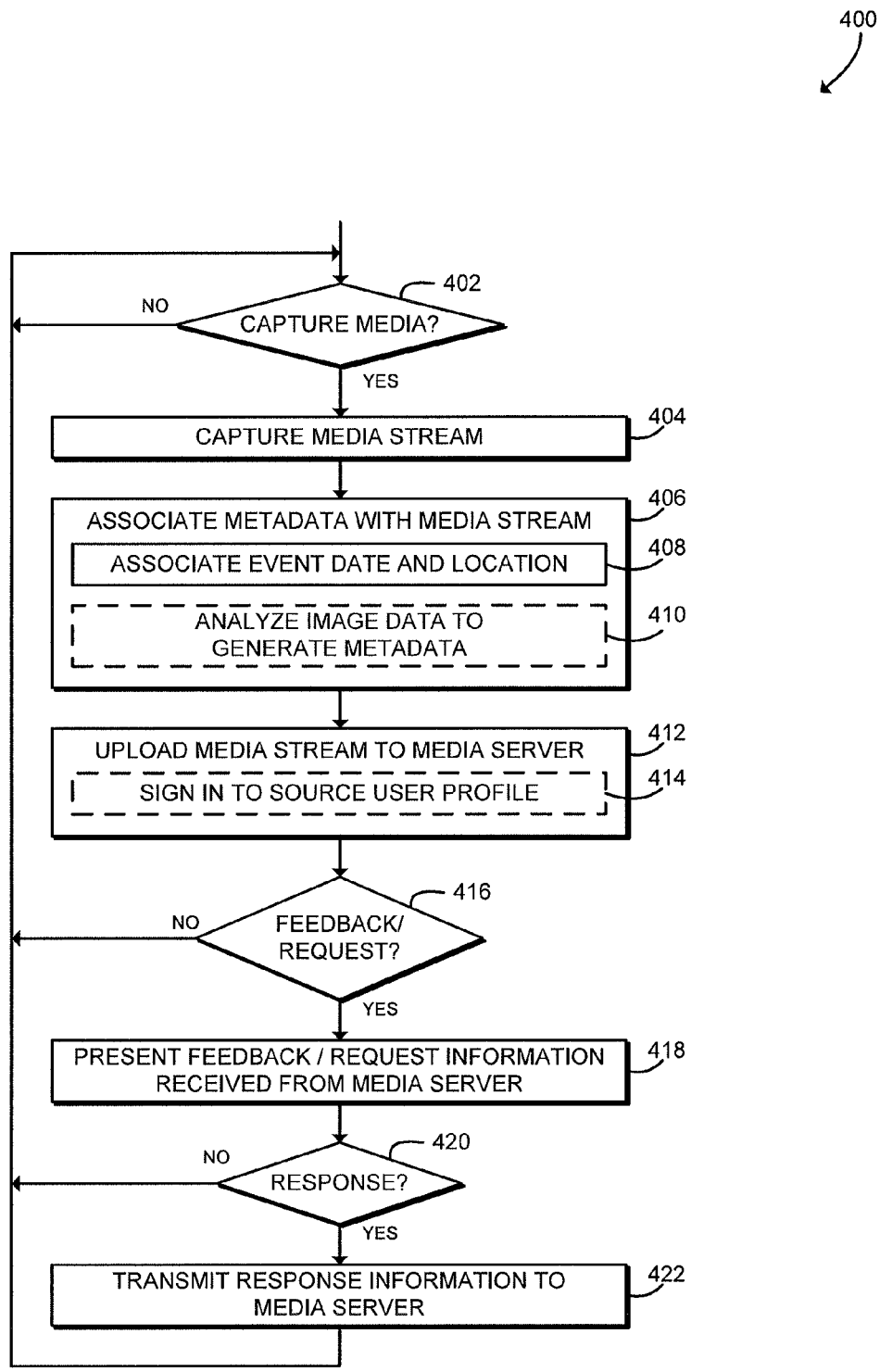
FIG. 4 is a simplified flow diagram of at least one embodiment of a method for live crowdsourced media streaming that may be executed by a mobile computing device of FIGS. 1 and 2.

Referring now to FIG. 4, in use, a mobile computing device 104 may execute a method 400 for live crowdsourced media streaming. The method 400 begins in block 402, in which the mobile computing device 104 determines whether to begin media capture. The mobile computing device 104 may begin media capture based on user input, for example when selected in a capture application. If the mobile computing device 104 determines not to begin media capture, the method 400 loops back to block 402 to continue waiting for media capture. If the mobile computing device 104 determines to begin media capture, the method 400 advances to block 404.

In block 404, the mobile computing device 104 captures a media stream. The media stream may be embodied as a video stream, an audio stream, a series of still images, or any other live stream of media data. In some embodiments, the mobile computing device 104 may sign, encrypt, or otherwise protect the media stream from unauthorized access using the security processor 158.

In block 406, the mobile computing device 104 associates metadata with the captured media stream. The mobile computing device 104 may embed the associated metadata into the media stream. The associated metadata may include an event attribute describing an event captured in the media stream. For example, the event attribute may be embodied as the event name, the event type, a description of the event content, or a description of the event venue. In block 408, the mobile computing device 104 associates an event date and location with the media stream. In some embodiments, the event location may be the current location of the mobile computing device 104, for example determined using the location circuitry 156. In block 410, in some embodiments the mobile computing device 104 may analyze the captured media stream to generate additional metadata. For example, the mobile computing device 104 may perform facial recognition on the media stream, determine the number of persons recognized in the media stream, determine the emotions displayed by persons recognized in the media stream, determine the image quality of the media stream, determine the relevance of the media stream to the current event, determine the precise view angle of the media stream, recognize objects pictured in the media stream, and/or any other media analysis capable of generating searchable metadata. That analysis may be instead of or in addition to analysis performed on the media server 102, described above with respect to block 312 of FIG. 3.

In block 412, the mobile computing device 104 uploads the captured media stream to the media server 102. Accordingly, the mobile computing device 104 also uploads any metadata embedded in the media stream. In block 414, in some embodiments, the mobile computing device 104 may sign in to a source user profile on the media server 102. As described above, the source user profile identifies a user of the mobile computing device 104, and may be used to store rating, scoring, or quality information related to media streams produced by the user.

After uploading the media stream, in block 416, the mobile computing device 104 determines whether feedback or request information has been received from the media server 102. As described above, the user of a client computing device 106 viewing the media stream may generate feedback information that is transmitted to the mobile computing device 104. If no feedback information is received, the method 400 loops back to 402 to continue capturing media streams. If feedback information is received, the method 400 advances to block 418.

In block 418, the mobile computing device 104 presents the feedback or request information to the user. For example, in some embodiments, the mobile computing device 104 may display a message on the display 150. As described above, feedback information may be embodied as a simple message to the content creator, rating or scoring information relating to the media stream, a request for similar content, a request for a modification to the media stream (e.g., changing locations, zooming in, refocusing on different aspects of the scene, etc.), or any other information submitted by the user of the client computing device 106 to the user of the mobile computing device 104. In some embodiments, the feedback information may include an offer to purchase rights in the media stream. In response to receiving the feedback information, the user of the mobile computing device 104 may perform the requested action, for example capturing a modified media stream of the event.

In block 420, the mobile computing device 104 determines whether a response should be generated to the feedback or request information. In some embodiments, the user of the mobile computing device 104 may input response information by manipulating a user interface of the mobile computing device 104. If no response should be generated, the method 400 loops back to block 402 to continue capturing media streams. If a response should be generated, the method 400 advances to block 422.

In block 422, the mobile computing device 104 transmits response information to the media server 102. Similar to the feedback information, the response may include any information submitted by the user of the mobile computing device 104 to the user of the client computing device 106. For example, the response may include an acceptance of an offer for compensation. As described above, after being received by the media server 102, the response information is transmitted to the client computing device 106 that originated the feedback information. After transmitting the response information, the method 400 loops back to block 402 to continue capturing media streams.

Figure 5:
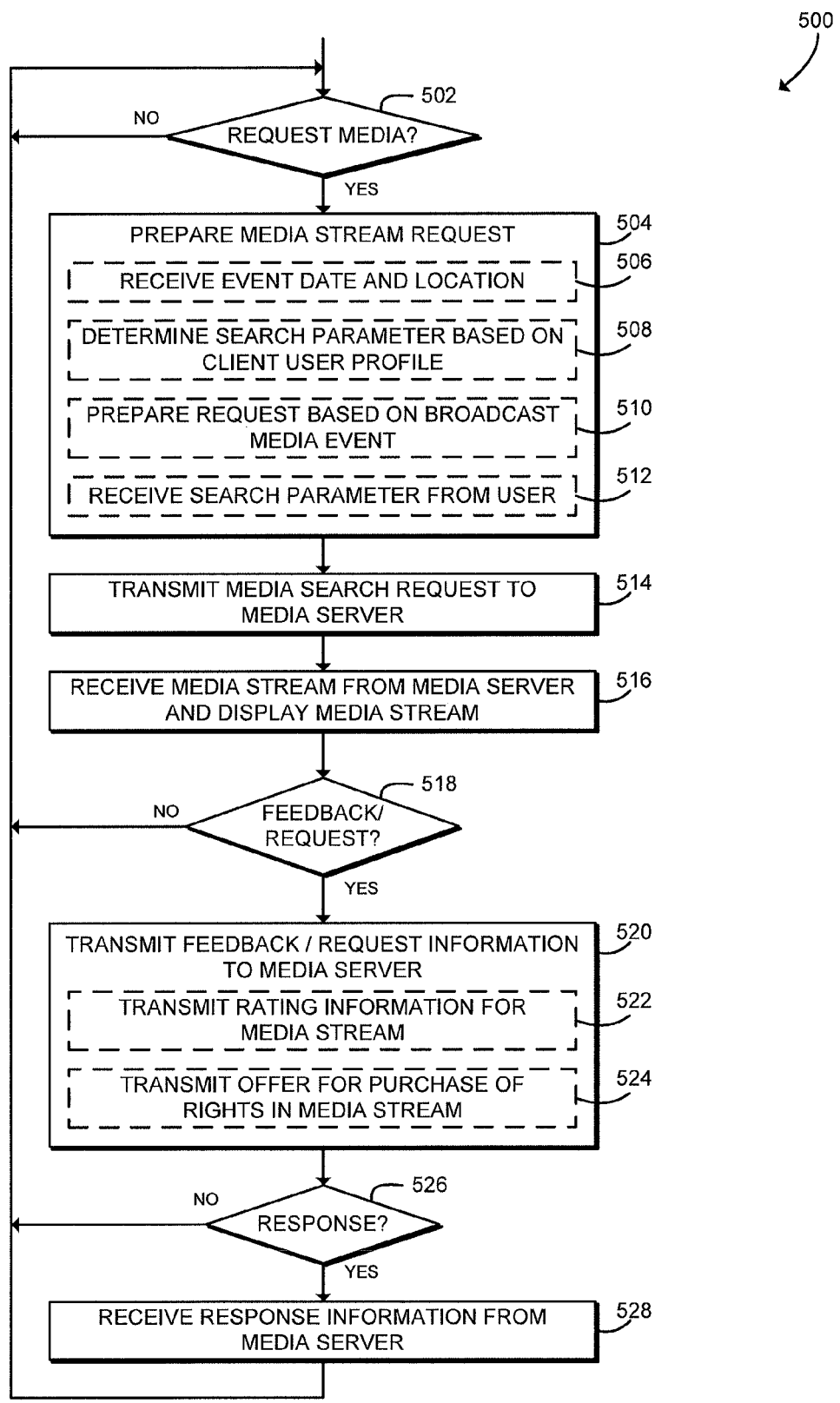
FIG. 5 is a simplified flow diagram of at least one embodiment of a method for live crowdsourced media streaming that may be executed by a client computing device of FIGS. 1 and 2.

Referring now to FIG. 5, in use, a client computing device 106 may execute a method 500 for live crowdsourced media streaming. The method 500 begins in block 502, in which the client computing device 106 determines whether to request a media stream from the media server 102. If not, the method 500 loops back to block 502 to continue waiting to request a media stream. If so, the method 500 advances to block 504.

In block 504, the client computing device 106 prepares a media stream request. The media stream request may include a search parameter that identifies a requested event. For example, the search parameter may include the event name, the event type, a description of the event content, or a description of the event venue. In some embodiments, the search parameter may describe other attributes of the media stream desired by the user. For example, the search parameter may specify faces captured in the media stream, number of persons captured in the media stream, emotions of persons captured in the media stream, image quality of the media stream, relevance of the media stream to the event, view angles of the media stream, and objects captured in the media stream.

In block 506, in some embodiments, the client computing device 106 receives an event date and location of the requested event. In some embodiments, the event date and location may be supplied by the user of the client computing device 106. For example, the user may follow an event by registering a particular time and place using the client computing device 106. In some embodiments, the registered time and place may correspond to a future event, and the client computing device 106 may activate at that future time and place to request media streaming. In other embodiments, the event date and location may be the current location of the client computing device 106, for example provided by the location circuitry 172. For live streaming, the event date is the current date. In some embodiments, the user may request a date or range of dates in the past, to search for a historical event. For example, the user may request all events at a particular venue in the past week.

In block 508, in some embodiments the client computing device 106 may determine a search parameter based on a client user profile associated with a user of the client computing device 106. The client user profile may store user preferences or defaults used for all media stream searches. As described above with respect to block 324 of FIG. 3, the client user profile may also store past user behavior used to predict search parameters.

In block 510, in some embodiments the client computing device 106 prepares the media stream request based on a broadcast media event. The broadcast media event may be embodied as a live television broadcast, a radio broadcast, a live streamed event, or any other event that may be experienced remotely by many people. The user of the client computing device 106 may expressly select the broadcast media event, or the broadcast media event may be selected based on the user's current viewing activities. For example, the broadcast media event may be a sporting event broadcast over live television. When the user of the client computing device 106 tunes to the sporting event, the client computing device 106 may include that sporting event in the media stream request. In some embodiments, the broadcast media event may be displayed on a device other than the client computing device 106.

In block 512, in some embodiments the client computing device 106 receives an arbitrary search parameter from the user. The user may input the search parameter through a user interface of the client computing device 106.

In block 514, the client computing device 106 transmits the media stream request to the media server 102. In block 516, the client computing device 106 receives and displays a media stream from the media server 102 in response to the media stream request. As described above, the client computing device 106 may receive multiple matching media streams from the media server 102, and the streams may be received contemporaneously, sequentially, or in any other order. Similarly, the media streams may be displayed in numerous modes, depending on the form factor of the client computing device 106. For example, for handheld client computing devices 106 with small screens such as smartphones, the media streams may be displayed on the display 170 in a full-screen mode, or as user interface widgets integrated with the user interface of the client computing device 106. Larger client computing devices 106 such as digital televisions may display the media streams alongside other content or overlaying other content in a picture-in-picture mode. For example, the media streams may be displayed alongside an associated broadcast media event. In some embodiments, the broadcast media event may be displayed on the client computing device 106; in other embodiments the broadcast media event may be displayed on a separate device. For example, a smaller client computing device 106 may display media streams that are complimentary to a broadcast media event displayed on a separate digital television.

The client computing device 106 may display one media stream at a time, or may display all received media streams simultaneously, for example tiled across the display 170. In some embodiments, the client computing device 106 may use view angle metadata associated with the media streams to provide complete coverage of an event from numerous angles. Additionally, in some embodiments, numerous media streams from different view angles may be combined into a single panoramic view of the event. The client computing device 106 may support multiple such display modes, and may support changing between the display modes in some embodiments. To display the media stream, in some embodiments the client computing device 106 may decrypt, authenticate, or otherwise access the media stream using the security processor 174.

After displaying the media stream, in block 518 the client computing device 106 determines whether to transmit feedback or a request to the media server 102. If not, the method 500 loops back to block 502 to continue requesting media streams. If so, the method 500 advances to block 520.

In block 520, the client computing device 106 transmits feedback or request information to the media server 102. As described above, feedback information may be embodied as a simple message to the content creator, rating or scoring information relating to the media stream, a request for similar content, a request for a modification to the media stream (e.g., changing locations, zooming in, refocusing on different aspects of the scene, etc.), or any other information submitted by the user of the client computing device 106 to the user of the mobile computing device 104. The user of the client computing device 106 may provide feedback through a user interface of the client computing device 106. In block 522, in some embodiments the client computing device 106 transmits rating or scoring information associated with the media stream to the media server 102. The rating or scoring information may rate the media stream in terms of quality, relevance, offensiveness, or any other similar metric. The rating or scoring information may be associated by the media server 102 with the media stream itself, with the source user profile associated with the media stream, or both. In block 524, in some embodiments, the feedback information may include an offer to purchase rights in the media stream.

In block 526, the client computing device 106 determines whether a response to the feedback information has been received from the media server 102. If not, the method 500 loops back to block 502 to continue requesting media streams. If so, the method 500 advances to block 528. In block 528, the client computing device 106 receives response information from the media server 102. As described above, similar to the feedback information, the response may include any information submitted by the user of the mobile computing device 104 to the user of the client computing device 106. For example, the response may include an acceptance of an offer for compensation. After receiving the response information, the method 500 loops back to block 502 to continue requesting media streams.

EXAMPLES

Illustrative examples of the technologies disclosed herein are provided below. An embodiment of the technologies may include any one or more, and any combination of, the examples described below.

Example 1 includes a media server for cloud media streaming, the media server comprising a communication module to receive a media stream transmitted from a mobile computing device and receive a media request from a client computing device, the media request including a requested event attribute; and a metadata module to associate metadata with the media stream, the metadata to describe a plurality of attributes of the media stream, the attributes to include an event attribute that identifies an event captured in the media stream; and search for media streams having the event attribute matching the requested event attribute of the media request; wherein the communication module is further to contemporaneously stream the media stream received from the mobile computing device to the client computing device in response to the media stream received from the mobile computing device having the event attribute matching the requested event attribute of the media request.

Example 2 includes the subject matter of Example 1, and wherein the event attribute comprises a name that identifies the event captured in the media stream.

Example 3 includes the subject matter of any of Examples 1 and 2, and wherein the event attribute comprises a date attribute and a location attribute that identify the event captured in the media stream; the media request comprises a requested date attribute and a requested location attribute; and to search for media streams comprises to search for media streams having the date attribute matching the requested date attribute and having the location attribute matching the requested location attribute.

Example 4 includes the subject matter of any of Examples 1-3, and wherein the media request comprises a current location of the client computing device.

Example 5 includes the subject matter of any of Examples 1-4, and wherein the event attribute comprises one of: an event type, an event content, or an event venue.

Example 6 includes the subject matter of any of Examples 1-5, and wherein the event attribute comprises an event attribute that identifies a broadcast media event associated with the media stream; and the media request comprises a requested broadcast media event.

Example 7 includes the subject matter of any of Examples 1-6, and wherein the media request comprises a broadcast media event that is displayed on a second client computing device.

Example 8 includes the subject matter of any of Examples 1-7, and wherein the metadata module further to process the media stream to generate metadata describing an attribute of the media stream; and the media request comprises a requested metadata attribute.

Example 9 includes the subject matter of any of Examples 1-8, and wherein to process the media stream to generate the metadata comprises to process the media stream to generate metadata describing at least one of: faces recognized in the media stream, number of persons recognized in the media stream, emotions of persons recognized in the media stream, image quality of the media stream, relevance of the media stream to the event attribute, view angle of the media stream, or objects recognized in the media stream.

Example 10 includes the subject matter of any of Examples 1-9, and wherein the metadata module further to archive the media stream and the associated metadata for future retrieval; the communication module further to receive a second media request from a second client computing device, the second media request to specify a historical date attribute of the media stream; the metadata module further to identify the archived media stream having a date attribute matching the historical date attribute of the second media request; and the communication module to stream the identified archived media stream to the second client computing device.

Example 11 includes the subject matter of any of Examples 1-10, and wherein the communication module further to receive feedback information relating to the media stream from the client computing device; and forward the feedback information from the media server to the mobile computing device.

Example 12 includes the subject matter of any of Examples 1-11, and wherein the communication module further to receive response information in response to the feedback information from the mobile computing device; and forward the response information from the media server to the client computing device.

Example 13 includes the subject matter of any of Examples 1-12, and wherein the feedback information comprises an offer to purchase rights in the media stream.

Example 14 includes the subject matter of any of Examples 1-13, and wherein the metadata module further to associate the media stream with a source user profile identifying a user of the mobile computing device; and receive user score data associated with the source user profile from a second client computing device; wherein the media request comprises a requested user score attribute; and to search for media streams comprises to search for media streams associated with a source user profile having user score data matching the requested user score attribute.

Example 15 includes the subject matter of any of Examples 1-14, and wherein the metadata module further to associate the media request with a client user profile; and determine the requested event attribute of the media request based on the associated client user profile.

Example 16 includes the subject matter of any of Examples 1-15, and wherein to determine the requested event attribute based on the associated client user profile comprises to determine the requested event attribute based on previous activities associated with the client user profile.

Example 17 includes the subject matter of any of Examples 1-16, and wherein the metadata module further to identify an advertisement based on the media stream; and stream the identified advertisement to the client computing device contemporaneously with the media stream.

Example 18 includes the subject matter of any of Examples 1-17, and wherein the metadata module further to associate the media stream with a source user profile identifying a user of the mobile computing device; receive user score data relating to the source user profile from a second client computing device; identify an advertisement based on the user score data of the source profile associated with the media stream; and stream the identified advertisement to the client computing device contemporaneously with the media stream.

Example 19 includes a mobile computing device for generating a cloud media stream, the mobile computing device comprising a capture module to capture a media stream; a metadata module to associate metadata with the media stream, the metadata describing a current location of the mobile computing device; and upload the media stream to a media server, the media stream to be streamed contemporaneously to a client computing device; and a feedback/request module to receive from the media server feedback information generated by the client computing device, the feedback information to relate to the media stream.

Example 20 includes the subject matter of Example 19, and wherein the feedback information comprises an offer to purchase rights in the media stream.

Example 21 includes the subject matter of any of Examples 19 and 20, and wherein the capture module further to capture a modified media stream in response to the feedback information.

Example 22 includes a method for cloud media streaming, the method comprising receiving, on a media server, a media stream transmitted from a mobile computing device; associating, on the media server, metadata with the media stream, the metadata describing a plurality of attributes of the media stream, the attributes including an event attribute that identifies an event captured in the media stream; receiving, on the media server, a media request from a client computing device, the media request including a requested event attribute; searching, on the media server, for media streams having the event attribute matching the requested event attribute of the media request; and contemporaneously streaming the media stream received from the mobile computing device to the client computing device in response to the media stream received from the mobile computing device having the event attribute matching the requested event attribute of the media request.

Example 23 includes the subject matter of Example 22, and wherein the event attribute comprises a name that identifies the event captured in the media stream.

Example 24 includes the subject matter of any of Examples 22 and 23, and wherein the event attribute comprises a date attribute and a location attribute that identify the event captured in the media stream; receiving the media request comprises receiving a media request including a requested date attribute and a requested location attribute; and searching for media streams comprises searching for media streams having the date attribute matching the requested date attribute and having the location attribute matching the requested location attribute.

Example 25 includes the subject matter of any of Examples 22-24, and wherein receiving the media request comprises receiving a media request associated with a current location of the client computing device.

Example 26 includes the subject matter of any of Examples 22-25, and wherein the event attribute comprises one of: an event type, an event content, or an event venue.

Example 27 includes the subject matter of any of Examples 22-26, and wherein the event attribute comprises an event attribute that identifies a broadcast media event associated with the media stream; and receiving the media request comprises receiving a media request associated with a requested broadcast media event.

Example 28 includes the subject matter of any of Examples 22-27, and wherein receiving the media request associated with the requested broadcast media event comprises receiving a media request associated with a broadcast media event being displayed on a second client computing device.

Example 29 includes the subject matter of any of Examples 22-28, and wherein associating the metadata with the media stream comprises processing the media stream to generate metadata describing an attribute of the media stream; and receiving the media request comprises receiving a media request associated with a requested metadata attribute.

Example 30 includes the subject matter of any of Examples 22-29, and wherein processing the media stream to generate the metadata comprises processing the media stream to generate metadata describing at least one of: faces recognized in the media stream, number of persons recognized in the media stream, emotions of persons recognized in the media stream, image quality of the media stream, relevance of the media stream to the event attribute, view angle of the media stream, or objects recognized in the media stream.

Example 31 includes the subject matter of any of Examples 22-30, and further including archiving, on the media server, the media stream and the associated metadata for future retrieval; receiving, on the media server, a second media request from a second client computing device, the second media request specifying a historical date attribute of the media stream; identifying, on the media server, the archived media stream having a date attribute matching the historical date attribute of the second media request; and streaming the identified archived media stream to the second client computing device.

Example 32 includes the subject matter of any of Examples 22-31, and further including receiving, on the media server, feedback information relating to the media stream from the client computing device; and forwarding the feedback information from the media server to the mobile computing device.

Example 33 includes the subject matter of any of Examples 22-32, and further including receiving, on the media server, response information in response to the feedback information from the mobile computing device; and forwarding the response information from the media server to the client computing device.

Example 34 includes the subject matter of any of Examples 22-33, and wherein receiving the feedback information comprises receiving an offer to purchase rights in the media stream.

Example 35 includes the subject matter of any of Examples 22-34, and further including associating, on the media server, the media stream with a source user profile identifying a user of the mobile computing device; and receiving, on the media server, user score data associated with the source user profile from a second client computing device; wherein receiving the media request comprises receiving a media request associated with a requested user score attribute; and searching for media streams comprises searching for media streams associated with a source user profile having user score data matching the requested user score attribute.

Example 36 includes the subject matter of any of Examples 22-35, and further including associating, on the media server, the media request with a client user profile; and determining, on the media server, the requested event attribute of the media request based on the associated client user profile.

Example 37 includes the subject matter of any of Examples 22-36, and wherein determining the requested event attribute based on the associated client user profile comprises determining the requested event attribute based on previous activities associated with the client user profile.

Example 38 includes the subject matter of any of Examples 22-37, and further including identifying, on the media server, an advertisement based on the media stream; and streaming the identified advertisement to the client computing device contemporaneously with the media stream.

Example 39 includes the subject matter of any of Examples 22-38, and further including associating, on the media server, the media stream with a source user profile identifying a user of the mobile computing device; receiving, on the media server, user score data relating to the source user profile from a second client computing device; identifying, on the media server, an advertisement based on the user score data of the source profile associated with the media stream; and streaming the identified advertisement to the client computing device contemporaneously with the media stream.

Example 40 includes a method for generating a cloud media stream, the method comprising capturing, on a mobile computing device, a media stream; associating, on the mobile computing device, metadata with the media stream, the metadata describing a current location of the mobile computing device; uploading the media stream to a media server, the media stream to be streamed contemporaneously to a client computing device; and receiving, on the mobile computing device and from the media server, feedback information generated by the client computing device, the feedback information relating to the media stream.

Example 41 includes the subject matter of Example 40, and wherein receiving the feedback information comprises receiving an offer to purchase rights in the media stream.

Example 42 includes the subject matter of any of Examples 40 and 41, and further including capturing, on the mobile computing device, a modified media stream in response to the feedback information.

Example 43 includes a computing device comprising a processor; and a memory having stored therein a plurality of instructions that when executed by the processor cause the computing device to perform the method of any of Examples 22-42.

Example 44 includes one or more machine readable storage media comprising a plurality of instructions stored thereon that in response to being executed result in a computing device performing the method of any of Examples 22-42.

Example 45 includes a computing device comprising means for performing the method of any of Examples 22-42.

Example 46 includes a media server for cloud media streaming, the media server including means for receiving a media stream transmitted from a mobile computing device; means for associating metadata with the media stream, the metadata describing a plurality of attributes of the media stream, the attributes including an event attribute that identifies an event captured in the media stream; means for receiving a media request from a client computing device, the media request including a requested event attribute; means for searching for media streams having the event attribute matching the requested event attribute of the media request; and means for contemporaneously streaming the media stream received from the mobile computing device to the client computing device in response to the media stream received from the mobile computing device having the event attribute matching the requested event attribute of the media request.

Example 47 includes the subject matter of Example 46, and wherein the event attribute comprises a name that identifies the event captured in the media stream.

Example 48 includes the subject matter of any of Examples 46 and 47, and wherein the event attribute comprises a date attribute and a location attribute that identify the event captured in the media stream; the means for receiving the media request comprises means for receiving a media request including a requested date attribute and a requested location attribute; and the means for searching for media streams comprises means for searching for media streams having the date attribute matching the requested date attribute and having the location attribute matching the requested location attribute.

Example 49 includes the subject matter of any of Examples 46-48, and wherein the means for receiving the media request comprises means for receiving a media request associated with a current location of the client computing device.

Example 50 includes the subject matter of any of Examples 46-49, and wherein the event attribute comprises one of: an event type, an event content, or an event venue.

Example 51 includes the subject matter of any of Examples 46-50, and wherein the event attribute comprises an event attribute that identifies a broadcast media event associated with the media stream; and the means for receiving the media request comprises means for receiving a media request associated with a requested broadcast media event.

Example 52 includes the subject matter of any of Examples 46-51, and wherein the means for receiving the media request associated with the requested broadcast media event comprises means for receiving a media request associated with a broadcast media event being displayed on a second client computing device.

Example 53 includes the subject matter of any of Examples 46-52, and wherein the means for associating the metadata with the media stream comprises means for processing the media stream to generate metadata describing an attribute of the media stream; and the means for receiving the media request comprises means for receiving a media request associated with a requested metadata attribute.

Example 54 includes the subject matter of any of Examples 46-53, and wherein the means for processing the media stream to generate the metadata comprises means for processing the media stream to generate metadata describing at least one of: faces recognized in the media stream, number of persons recognized in the media stream, emotions of persons recognized in the media stream, image quality of the media stream, relevance of the media stream to the event attribute, view angle of the media stream, or objects recognized in the media stream.

Example 55 includes the subject matter of any of Examples 46-54, and further including means for archiving the media stream and the associated metadata for future retrieval; means for receiving a second media request from a second client computing device, the second media request specifying a historical date attribute of the media stream; means for identifying the archived media stream having a date attribute matching the historical date attribute of the second media request; and means for streaming the identified archived media stream to the second client computing device.

Example 56 includes the subject matter of any of Examples 46-55, and further including means for receiving feedback information relating to the media stream from the client computing device; and means for forwarding the feedback information from the media server to the mobile computing device.

Example 57 includes the subject matter of any of Examples 46-56, and further including means for receiving response information in response to the feedback information from the mobile computing device; and means for forwarding the response information from the media server to the client computing device.

Example 58 includes the subject matter of any of Examples 46-57, and wherein the means for receiving the feedback information comprises means for receiving an offer to purchase rights in the media stream.

Example 59 includes the subject matter of any of Examples 46-58, and further including means for associating the media stream with a source user profile identifying a user of the mobile computing device; and means for receiving user score data associated with the source user profile from a second client computing device; wherein the means for receiving the media request comprises means for receiving a media request associated with a requested user score attribute; and the means for searching for media streams comprises means for searching for media streams associated with a source user profile having user score data matching the requested user score attribute.

Example 60 includes the subject matter of any of Examples 46-59, and further including means for associating the media request with a client user profile; and means for determining the requested event attribute of the media request based on the associated client user profile.

Example 61 includes the subject matter of any of Examples 46-60, and wherein the means for determining the requested event attribute based on the associated client user profile comprises means for determining the requested event attribute based on previous activities associated with the client user profile.

Example 62 includes the subject matter of any of Examples 46-61, and further including means for identifying an advertisement based on the media stream; and means for streaming the identified advertisement to the client computing device contemporaneously with the media stream.

Example 63 includes the subject matter of any of Examples 46-62, and further including means for associating the media stream with a source user profile identifying a user of the mobile computing device; means for receiving user score data relating to the source user profile from a second client computing device; means for identifying an advertisement based on the user score data of the source profile associated with the media stream; and means for streaming the identified advertisement to the client computing device contemporaneously with the media stream.

What is claimed is:

1. A media server for cloud media streaming, the media server comprising:
   a communication module to:
   receive a media stream transmitted from a mobile computing device, wherein the media stream includes video of an event; and
   receive a media request from a client computing device, the media request including (i) a requested event attribute and (ii) a requested seating arrangement attribute; and
   a metadata module to:
   process the media stream to determine a seating arrangement of the event at which the video was captured;
   associate metadata with the media stream, wherein the metadata describes a plurality of attributes of the media stream and wherein the attributes to include (i) an event attribute that identifies the event and (ii) a seating arrangement attribute that identifies the seating arrangement of the event at which the video was captured; and
   search for media streams having (i) the event attribute matching the requested event attribute of the media request and (ii) the seating arrangement attribute matching the requested seating arrangement attribute of the media request;
   wherein the communication module is further to:
   contemporaneously stream the media stream received from the mobile computing device to the client computing device in response to the media stream received from the mobile computing device having (i) the event attribute matching the requested event attribute of the media request and (ii) the seating arrangement attribute matching the requested seating arrangement attribute of the media request, receive feedback information relating to the media stream from the client computing device, forward the feedback information from the media server to the mobile computing device, and receive, from the mobile computing device, a modified media stream in response to forwarding of the feedback information.

2. The media server of claim 1, wherein:

the event attribute comprises a date attribute and a location attribute that identify the event captured in the media stream;

the media request comprises a requested date attribute and a requested location attribute; and to search for media streams comprises to search for media streams having the date attribute matching the requested date attribute and having the location attribute matching the requested location attribute.

3. The media server of claim 2, wherein the media request comprises a current location of the client computing device.

4. The media server of claim 1, wherein:

the event attribute comprises an event attribute that identifies a broadcast media event associated with the media stream; and the media request comprises a requested broadcast media event.

5. The media server of claim 1, wherein:

the metadata module further to process the media stream to generate metadata describing an attribute of the media stream; and the media request comprises a requested metadata attribute.

6. The media server of claim 5, wherein to process the media stream to generate the metadata comprises to process the media stream to generate metadata describing at least one of: faces recognized in the media stream, number of persons recognized in the media stream, emotions of persons recognized in the media stream, image quality of the media stream, relevance of the media stream to the event attribute, view angle of the media stream, or objects recognized in the media stream.

7. The media server of claim 1, wherein the feedback information comprises an offer to purchase rights in the media stream.

8. The media server of claim 1, wherein the metadata module further to:

associate the media stream with a source user profile identifying a user of the mobile computing device; and receive user score data associated with the source user profile from a second client computing device;

wherein:

the media request comprises a requested user score attribute; and to search for media streams comprises to search for media streams associated with a source user profile having user score data matching the requested user score attribute.

9. The media server of claim 1, wherein the metadata module further to:

associate the media request with a client user profile; and determine the requested event attribute of the media request based on the associated client user profile.

10. The media server of claim 1, wherein the metadata module further to:

identify an advertisement based on the media stream; and stream the identified advertisement to the client computing device contemporaneously with the media stream.

11. A mobile computing device for generating a cloud media stream, the mobile computing device comprising:

a capture module to capture a media stream, wherein the media stream includes a video of an event;

a metadata module to:

associate metadata with the media stream, the metadata including (i) an event attribute that identifies the event and (ii) a seating arrangement attribute that identifies the seating arrangement of the event at which the video was captured; and upload the media stream to a media server, the media stream to be streamed contemporaneously to a client computing device; and a feedback-request module to receive from the media server feedback information generated by the client computing device, the feedback information to relate to the media stream wherein the capture module is further to capture a modified media stream in response to the feedback information.

12. The mobile computing device of claim 11, wherein the feedback information comprises an offer to purchase rights in the media stream.

13. One or more non-transitory, computer-readable storage media comprising a plurality of instructions that in response to being executed cause a media server to:

receive a media stream transmitted from a mobile computing device wherein the media stream includes video of an event;

process the media stream to determine a seating arrangement of the event at which the video was captured associate metadata with the media stream, wherein the metadata describes a plurality of attributes of the media stream and wherein the attributes including (i) an event attribute that identifies the event and (ii) a seating arrangement attribute that identifies the seating arrangement of the event at which the video was captured;

receive a media request from a client computing device, the media request including (i) a requested event attribute and (ii) a requested seating arrangement attribute;

search for media streams having the event attribute matching the requested event attribute of the media request; and contemporaneously stream the media stream received from the mobile computing device to the client computing device in response to the media stream received from the mobile computing device having (i) the event attribute matching the requested event attribute of the media request and (ii) the seating arrangement attribute matching the requested seating arrangement attribute of the media request;

receive feedback information relating to the media stream from the client computing device;

forward the feedback information from the media server to the mobile computing device; and receive, from the mobile computing device, a modified media stream in response to forwarding of the feedback information.

14. The one or more non-transitory, computer-readable storage media of claim 13, wherein:

the event attribute comprises a date attribute and a location attribute that identify the event captured in the media stream;

to receive the media request comprises to receive a media request including a requested date attribute and a requested location attribute; and to search for media streams comprises to search for media streams having the date attribute matching the requested date attribute and having the location attribute matching the requested location attribute.

15. The one or more non-transitory, computer-readable storage media of claim 14, wherein to receive the media request comprises to receive a media request associated with a current location of the client computing device.

16. The one or more non-transitory, computer-readable storage media of claim 13, wherein:

to associate the metadata with the media stream comprises to process the media stream to generate metadata describing an attribute of the media stream; and to receive the media request comprises to receive a media request associated with a requested metadata attribute.

17. The one or more non-transitory, computer-readable storage media of claim 16, wherein to process the media stream to generate the metadata comprises to process the media stream to generate metadata describing at least one of: faces recognized in the media stream, number of persons recognized in the media stream, emotions of persons recognized in the media stream, image quality of the media stream, relevance of the media stream to the event attribute, view angle of the media stream, or objects recognized in the media stream.

18. The one or more non-transitory, computer-readable storage media of claim 13, wherein to receive the feedback information comprises to receive an offer to purchase rights in the media stream.

19. The one or more non-transitory, computer-readable storage media of claim 13, further comprising a plurality of instructions that in response to being executed cause the media server to:

identify an advertisement based on the media stream; and stream the identified advertisement to the client computing device contemporaneously with the media stream.

20. One or more non-transitory, computer-readable storage media comprising a plurality of instructions that in response to being executed cause a mobile computing device to:

capture a media stream, wherein the media stream includes a video of an event;

associate metadata with the media stream, the metadata including (i) an event attribute that identifies the event and (ii) a seating arrangement attribute that identifies the seating arrangement of the event at which the video was captured;

upload the media stream to a media server, the media stream to be streamed contemporaneously to a client computing device; and receive, from the media server, feedback information generated by the client computing device, the feedback information relating to the media stream; and capture a modified media stream in response to the feedback information.

21. The one or more non-transitory, computer-readable storage media of claim 20, wherein to receive the feedback information comprises to receive an offer to purchase rights in the media stream.

\* \* \* \* \*